US010794449B2

(12) United States Patent
Barnes et al.

(10) Patent No.: US 10,794,449 B2
(45) Date of Patent: Oct. 6, 2020

(54) VARIABLE COUNTERWEIGHT

(71) Applicant: CUMMINS INC., Columbus, IN (US)

(72) Inventors: David M. Barnes, Columbus, IN (US); Adam Jordan Pate, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 442 days.

(21) Appl. No.: 15/564,415

(22) PCT Filed: Apr. 14, 2015

(86) PCT No.: PCT/US2015/025741
§ 371 (c)(1),
(2) Date: Oct. 4, 2017

(87) PCT Pub. No.: WO2016/167748
PCT Pub. Date: Oct. 20, 2016

(65) Prior Publication Data
US 2018/0135727 A1 May 17, 2018

(51) Int. Cl.
F16F 15/26 (2006.01)
F16F 15/28 (2006.01)

(52) U.S. Cl.
CPC .......... F16F 15/265 (2013.01); F16F 15/283 (2013.01)

(58) Field of Classification Search
CPC ........ F16F 15/286; F16F 15/283; F16F 15/28; F16F 15/265; F16F 15/264; F16F 15/26;
(Continued)

(56) References Cited

U.S. PATENT DOCUMENTS 2,112,984 A 4/1938 Chilton
5,178,038 A 1/1993 Heniges
(Continued)

FOREIGN PATENT DOCUMENTS

CN 204004178 12/2014
GB 0 264 939 1/1927
WO WO 2009/099343 8/2009

OTHER PUBLICATIONS

International Search Report from corresponding PCT Patent Application No. PCT/US2015/025741, dated Jul. 16, 2015.
(Continued)

Primary Examiner — Richard W Ridley
Assistant Examiner — Brian J McGovern
(74) Attorney, Agent, or Firm — Foley & Lardner LLP

(57) ABSTRACT

Variable counterweight apparatuses, systems and methods. The variable counterweight system includes at least one rotatable actuator, a first variable counterweight assembly, and a second variable counterweight assembly. The first variable counterweight assembly is rotatably coupled to the rotatable actuator to rotate about a first axis. The first variable counterweight assembly is configured to geometrically reconfigure so as to change a first variable counterweight assembly center of gravity position with respect to the first variable counterweight assembly. The second variable counterweight assembly is rotatably coupled to the rotatable actuator to rotate about a second axis. The second variable counterweight assembly is configured to geometrically reconfigure so as to change a second variable counterweight assembly center of gravity position with respect to the second variable counterweight assembly.

27 Claims, 18 Drawing Sheets

(58) Field of Classification Search
CPC .... F16F 15/1471; F16F 15/1464; F16F 15/14; F16F 15/1205; F16F 15/1204; F16F 15/12
See application file for complete search history.

(56) References Cited

U.S. PATENT DOCUMENTS

| | | | |
|---|---|---|---|
| 7,721,701 B2* | 5/2010 | Dec | F01C 1/07 |
| | | | 123/241 |
| 9,915,317 B2* | 3/2018 | Ulbrich | F16F 15/145 |
| 2002/0121816 A1 | 9/2002 | Qiu et al. | |
| 2003/0221653 A1 | 12/2003 | Brevick et al. | |
| 2007/0179012 A1 | 8/2007 | Kimura et al. | |
| 2009/0277414 A1* | 11/2009 | Lee | F16F 15/264 |
| | | | 123/192.2 |
| 2011/0085889 A1* | 4/2011 | Manfredotti | F16F 15/1471 |
| | | | 415/119 |
| 2013/0104835 A1* | 5/2013 | Lee | F16F 15/265 |
| | | | 123/192.2 |
| 2015/0090073 A1 | 4/2015 | Glanfield et al. | |

OTHER PUBLICATIONS

Written Opinion from corresponding PCT Patent Application No. PCT/US2015/025741, dated Jul. 16, 2015.
Chinese Office Action from corresponding CN Application No. 201580078826.2, dated Jan. 2, 2019, pp. 1-11.

* cited by examiner

VARIABLE COUNTERWEIGHT

CROSS-REFERENCE TO RELATED APPLICATIONS

This application is a US national stage claiming the benefit of priority to PCT Patent Application No. PCT/US2015/025741, filed on Apr. 14, 2015, entitled "Variable Counterweight," the entire disclosure of which is incorporated herein by reference.

TECHNICAL FIELD

The present disclosure relates to counterweight systems for internal combustion engines.

BACKGROUND

Engine vibrations are impacted by various engine operating parameters. These parameters vary based on engine type and operating conditions of the engine. For example, engines with lower cylinder counts experience different vibration characteristics than engines with higher cylinder counts. Furthermore, the conditions may vary as the engine parameters such as speed and load vary or during operational modes such as downspeeding and cylinder deactivation. For architectures such as low cylinder count engines or those using downspeeding and/or cylinder deactivation, vibration mitigating techniques such as the implementation of dual mass flywheels and centrifugal pendulum vibration absorbers are unable to adequately address noise vibration and harshness (NVH) issues created by such architectures.

Low cylinder count engines, while generally having advantages associated with reduced part count, lower cost, higher reliability, smaller size, higher mechanical efficiency and higher closed cycle efficiency through lower relative combustion chamber surface area, are not widely deployed due to disadvantages associated with NVH. The active side powertrain vibrations of low cylinder count engines over 3 liters generate high engine vibrations that are difficult to accommodate by NVH mitigation devices such as dual mass flywheels and centrifugal pendulum vibration absorbers.

SUMMARY

Various embodiments disclosed herein provide apparatuses, systems, and methods of varying counterweight moments for vibration mitigation in engine systems.

A first set of embodiments provides a variable counterweight apparatus including a rotatable actuator, a first counterweight rotatably coupled to the rotatable actuator and a second counterweight rotatably coupled to the rotatable actuator. The first counterweight is rotatably coupled to the rotatable actuator to rotate about a first axis. The first counterweight is configured to geometrically reconfigure so as to change a first counterweight center of gravity position with respect to the first counterweight. The second counterweight is rotatably coupled to the rotatable actuator to rotate about a second axis. The second counterweight is configured to geometrically reconfigure so as to change a second counterweight center of gravity position with respect to the second counterweight.

A second set of embodiments provides a variable counterweight engine system including an internal combustion engine, an engine block, a plurality of cylinder bores, and a plurality of pistons. The plurality of pistons includes a plurality of piston rods coupled to a crankshaft. The engine system includes a rotatable actuator coupled to the crankshaft. The engine system includes a first counterweight rotatably coupled to the rotatable actuator to rotate about a first axis. The first counterweight is configured to geometrically reconfigure so as to change a first counterweight center of gravity position with respect to the first counterweight. The engine system includes a second counterweight rotatably coupled to the rotatable actuator to rotate about a second axis. The second counterweight is configured to geometrically reconfigure so as to change a second counterweight center of gravity position with respect to the second counterweight.

A third set of embodiments provides a method that includes providing a variable counterweight apparatus. The variable counterweight apparatus includes a rotatable actuator, a first counterweight and a second counterweight, each rotatably coupled to the rotatable actuator. The first counterweight is rotatably coupled to the rotatable actuator to rotate about a first axis. The first counterweight is configured to geometrically reconfigure so as to change a first counterweight center of gravity position with respect to the first counterweight. The second counterweight is rotatably coupled to the rotatable actuator to rotate about a second axis. The second counterweight is configured to geometrically reconfigure so as to change a second counterweight center of gravity position with respect to the second counterweight. The method includes moving the first counterweight center of gravity position with respect to the first counterweight by geometrically reconfiguring the first counterweight. The method includes moving a second counterweight center of gravity position with respect to the second counterweight by geometrically reconfiguring the second counterweight.

The inventors have appreciated that described embodiments provide adjustable engine mount vibration mitigation systems that permits engines, including, but not limited to low cylinder count engines, to reduce engine vibration under varying engine operating conditions and configurations.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive variable counterweight systems and methods of operating variable counterweight systems. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
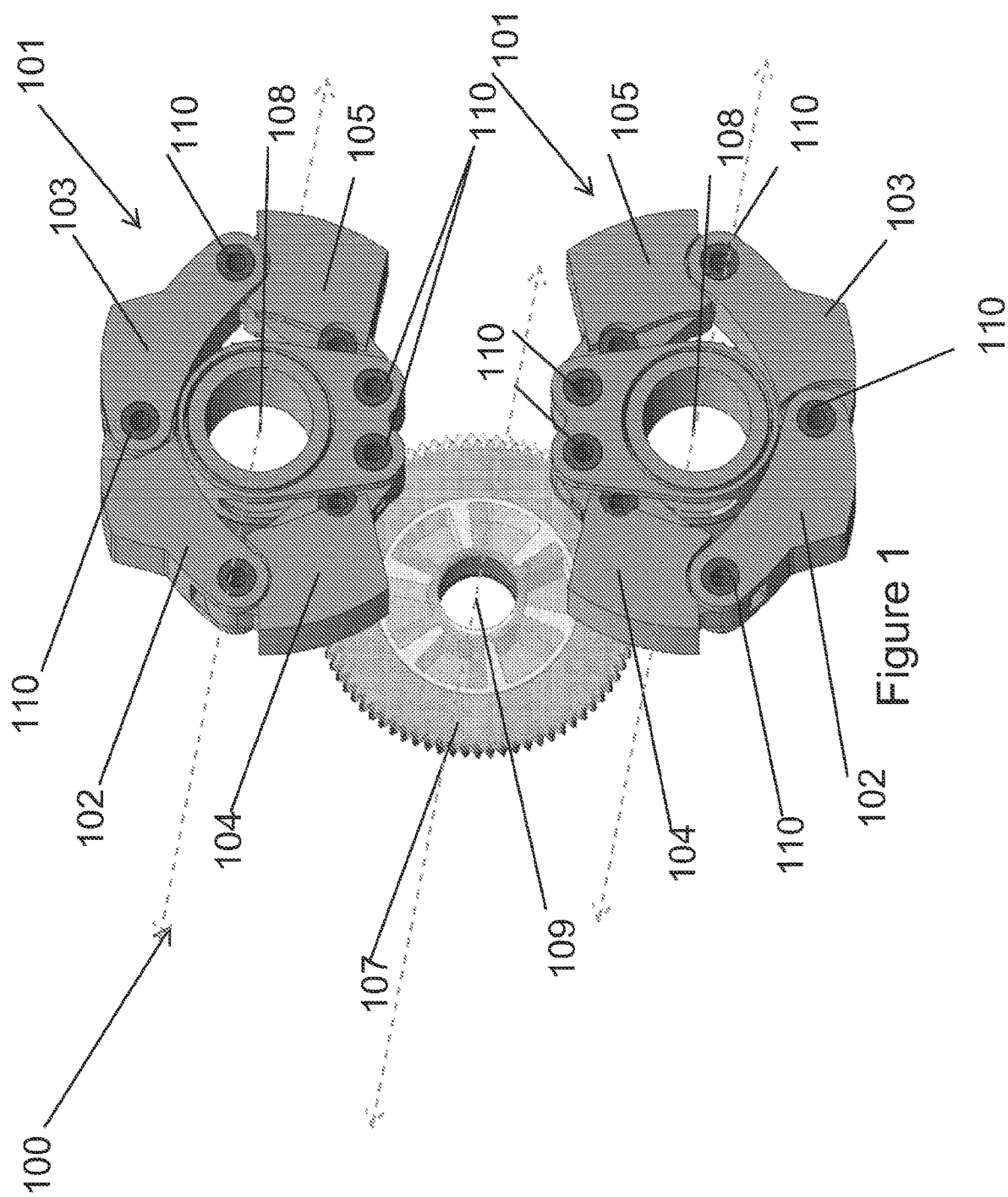
FIG. 1 is a perspective view of a variable counterweight system in accordance with an embodiment.
Figure 2:
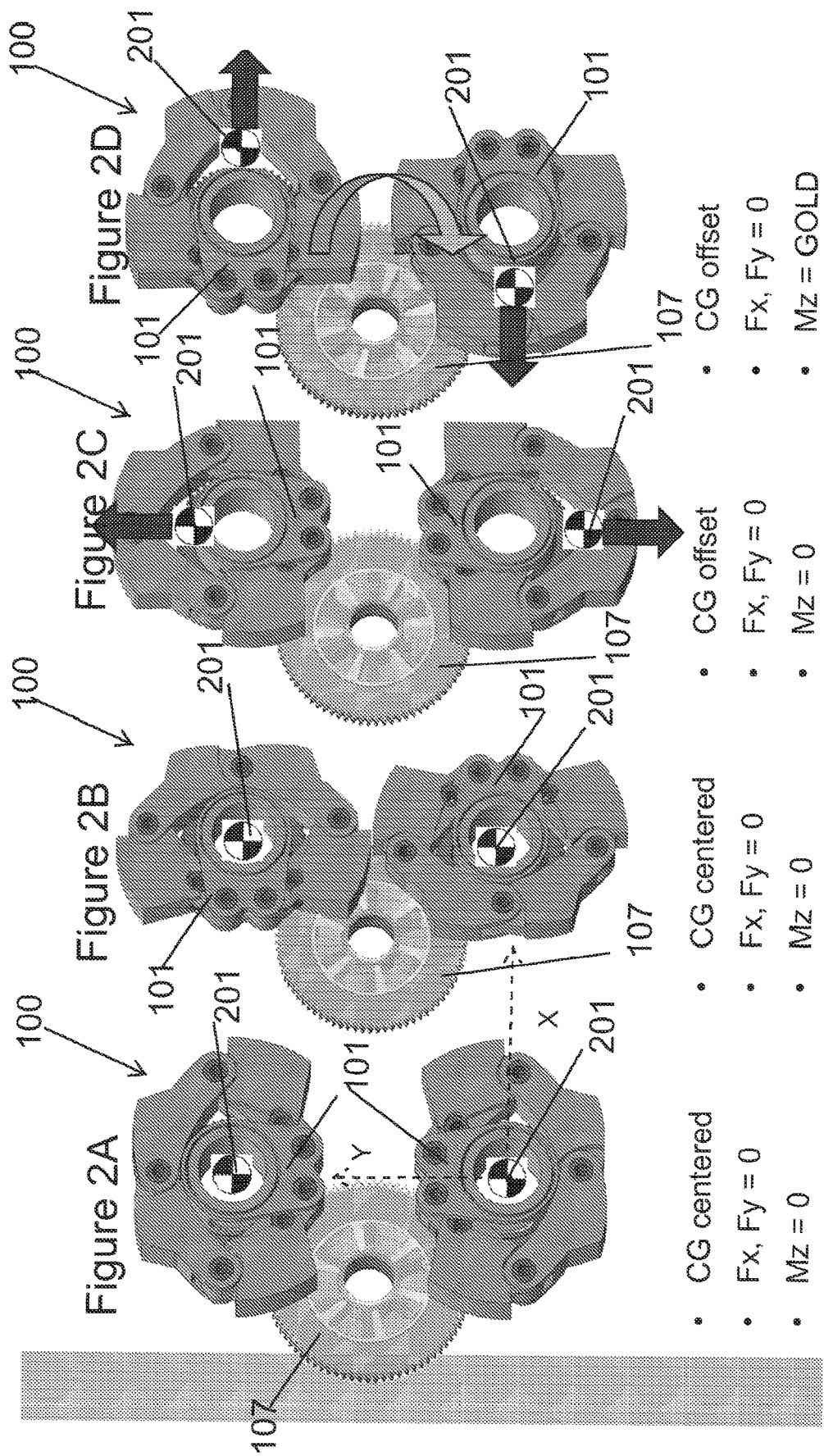
FIGS. 2A-2D are schematics of the variable counterweight system in varying positions and geometric configurations.

FIG. 1 is a perspective view of a variable counterweight system in accordance with an embodiment. The variable counterweight system 100 includes two counterweight assemblies and, in particular, variable geometry counterweight assemblies 101. The variable geometry counterweight assemblies 101 are synchronous co-rotating counterweights. A rotatable actuator 107 is configured to rotate about axis 109, for example, during operation of an engine to actuate the variable geometry counterweight assemblies 101 to rotate about axes 108. The variable geometry counterweight assemblies 101 are synchronously deployed and controlled to generate a variable moment to counteract torque roll generated by the force couple created by piston thrust loading forces and main bearing reaction forces in an internal combustion engine. For example, each of the variable geometry counterweight assemblies 101 may have an initial center of gravity position that corresponds to the axis 108 of rotation or centerline of rotation about which the variable geometry counterweight assemblies 101 rotate. Through actuation of the rotatable actuator, the center of gravity per assembly 101 can be made to be eccentric about axis 108. FIGS. 2C and 2D show how this actuation, along with the synchronous rotation of the counterweight system, creates a moment that can be varied in magnitude by geometrically reconfiguring the assembly 101.

The variable geometry counterweight assemblies 101 include a plurality of linkages, including a first radially outer linkage 102, a second radially outer linkage 103, a first radially inner linkage 104, and a second radially inner linkage 105. The first radially outer linkage 102, the second radially outer linkage 103, the first radially inner linkage 104, and the second radially inner linkage 105, are pivotally coupled to each other by a plurality of linkage bearings 110 that allow the linkages to pivot with respect to one another to geometrically reconfigure the shape of the variable geometry counterweight system 101. Geometrical reconfiguration of the variable geometry counterweight assembly 101 changes the position of the center of gravity of the respective variable geometry counterweight assembly 101 about axis 108

The variable geometry counterweight systems 101 can include a phaser system configured to actuate the first radially outer linkage 102, the second radially outer linkage 103, the first radially inner linkage 104, and the second radially inner linkage 105, for example, via a change in a fluid pressure in the variable geometry counterweight system 101 in particular embodiments. The phaser system can include a return spring configured to cause the first radially outer linkage 102, the second radially outer linkage 103, the first radially inner linkage 104, and the second radially inner linkage 105 to return to a starting position in example embodiments. The phaser may be integrated, for example, onto the axis of each of the variable geometry counterweight systems 101. In particular embodiments, a single phaser can be employed to articulate both variable geometry counterweight systems 101 concurrently. The phaser can be implemented to control the amount of offset that the center of gravity of each variable counterweight assembly 101 is moved about axes 108.

FIGS. 2A-2D are schematics of a variable counterweight system in varying positions of rotation and varying geometric configurations. In FIGS. 2A and 2B, the center of gravity 201 of the variable geometry counterweight assembly 101 is centered within each of the counterweight assemblies. Accordingly, as the variable geometry counterweight assemblies 101 spin about axis 108, the variable geometry counterweight assemblies 101 impart substantially zero forces along the x and y axes and therefore apply no net moment on the variable counterweight system 100. In FIGS. 2C and 2D the center of gravity 201 of the variable geometry counterweight assemblies 101 is offset from the center of rotation or axis 108 by geometrical reconfiguration. Accordingly, as shown in FIG. 2C when the variable geometry counterweight assemblies 101 spin to the illustrated position, each applies a force that is equal and opposite of one another such that no net moment is applied at the illustrated spin location. In contrast, as shown in FIG. 2D when the center of gravity 201 of the variable geometry counterweight assemblies 101 is offset from the axes 108 and the variable geometry counterweight assemblies 101 reach the illustrated spin position, a net force is applied by each variable geometry counterweight assembly 101 which results in a net moment created by the variable geometry counterweight system 100. The magnitude of the net moment applied is variably controlled by the magnitude of the center of gravity eccentricity per variable counterweight assembly 101.

The distance from the axis 108 to the center of gravity 201 or the separation distance between the axes 108 per assembly 101 is actively controlled to generate an anti-roll moment opposed to the engine roll caused by different engine operating conditions. For example, larger distances between the axis 108 and the center of gravity 201 or larger distances between the axes 108 per assembly 101 generate larger anti-roll moments for specific engine load operations while lower distances between the axis 108 and the center of gravity 201 generate lower anti-roll moments for different, specific engine load operations. Accordingly, the distance from the axis 108 to the center of gravity can be variably controlled in response to conditions of engine operation, such as engine rotational speed, engine load, detected vibration frequencies or amplitudes, or other relevant input parameters.

Figure 3:
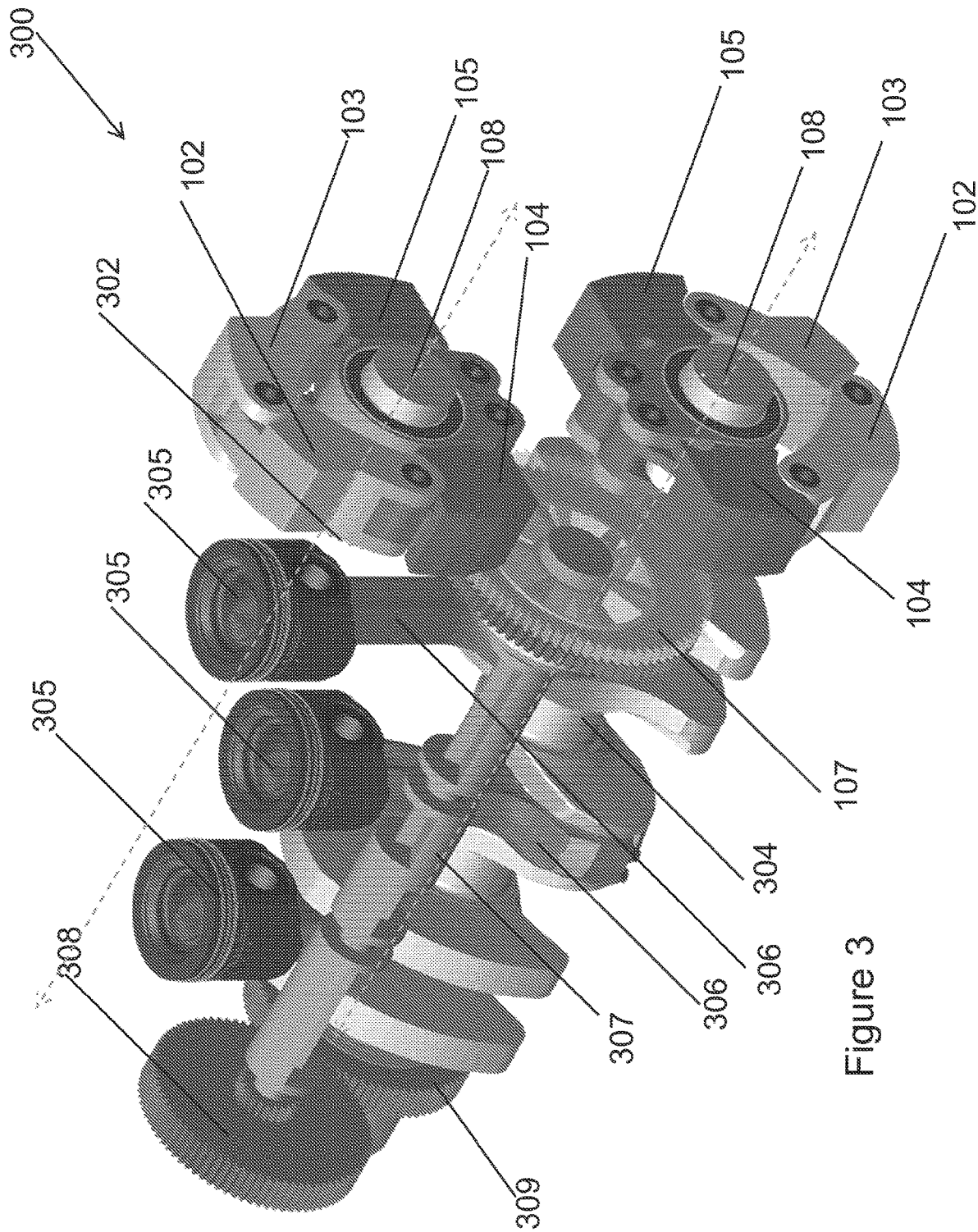
FIG. 3 is a perspective view of an engine system including a variable counterweight system in accordance with an embodiment.

FIG. 3 is a perspective view of an engine system including a variable counterweight system in accordance with an embodiment. In the illustrated embodiment, the variable geometry counterweight apparatus 100 is coupled to an engine system 300, which is a 3 cylinder engine system, including three pistons 305 coupled to piston rods 306 (for example housed within cylinder bores of an engine block), and a crankshaft 304. The rotatable actuator 107 is rotatably coupled to the crankshaft 304 via actuator shaft 307, actuator gear 308, and crank gear 309 and is parallel to the crankshaft 304. Accordingly, as combustion occurs in the engine system 300 to actuate the pistons 305, which drive the piston rods 306, and rotate the crankshaft 304, the rotatable actuator 107 can be rotated. Rotation of the rotatable actuator 107 can cause rotation of the variable geometry counterweight systems 101 via variable geometry counterweight system gears 302 among other potential forms of rotational transmission. The variable geometry counterweight assemblies 101 rotate about variable geometry counterweight shaft 108 and are activated as desired to move the center of gravity of the variable geometry counterweight assemblies 101 away from or towards the variable geometry counterweight shafts 108 via geometrical reconfiguration. The co-rotating variable geometry counterweight systems 101 are configured to spin at some multiple of engine speed associated with maximizing the NVH cancellation effects of the system on a given engine architecture.

Figure 4:
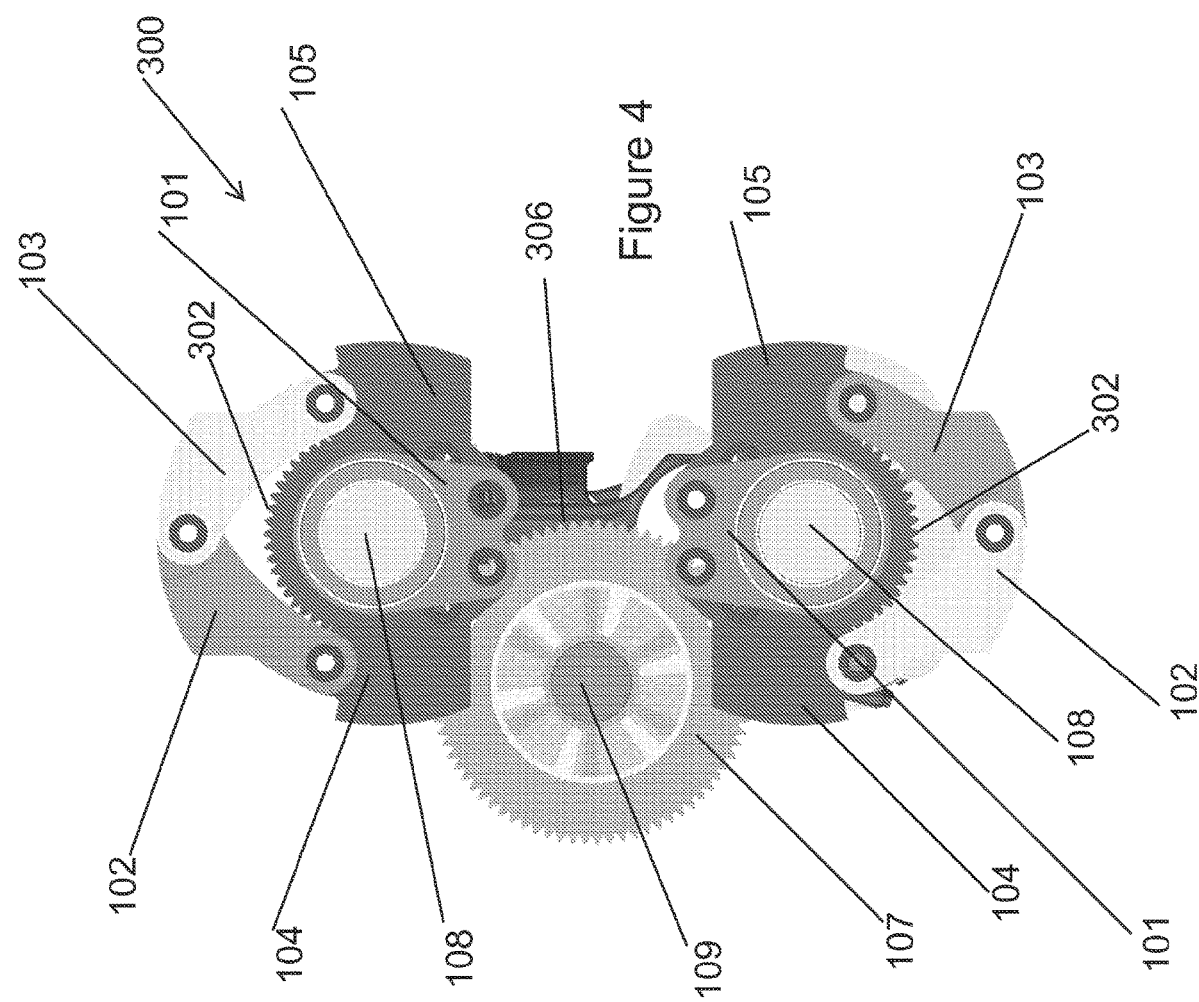
FIG. 4 is an end view of the engine system of FIG. 3.

FIG. 4 is an end view of the engine system of FIG. 3. As shown in FIG. 3, the variable geometry counterweight assemblies 101 are positioned such that they are parallel with the pistons 305 (shown in FIG. 3) and the piston rods 306 of the engine system 300. Note that this system location with respect to pistons and rods is for illustrative purposes and does not preclude assemblies 101 from being located in other positions on engine assembly 300. The variable geometry counterweight system gears 302 are visible, with the center of gravity of the variable geometry counterweight assemblies 101 offset via pivoting of the first radially outer linkage 102, the second radially outer linkage 103, the first radially inner linkage 104, and the second radially inner linkage 105 of the variable geometry counterweight assemblies 101. The variable geometry counterweight system gears 302 are coaxial with the variable geometry counterweight shafts 108. The variable geometry counterweight shafts 108 are parallel with the crankshaft 304. The variable geometry counterweight shafts 108 provide an access point for pressurized fluid to enter the variable geometry counterweight systems 101 to cause the first radially outer linkage 102, the second radially outer linkage 103, the first radially inner linkage 104, and the second radially inner linkage 105 to pivot and geometrically reconfigure the variable geometry counterweight systems 101, in accordance with example embodiments.

Figure 5:
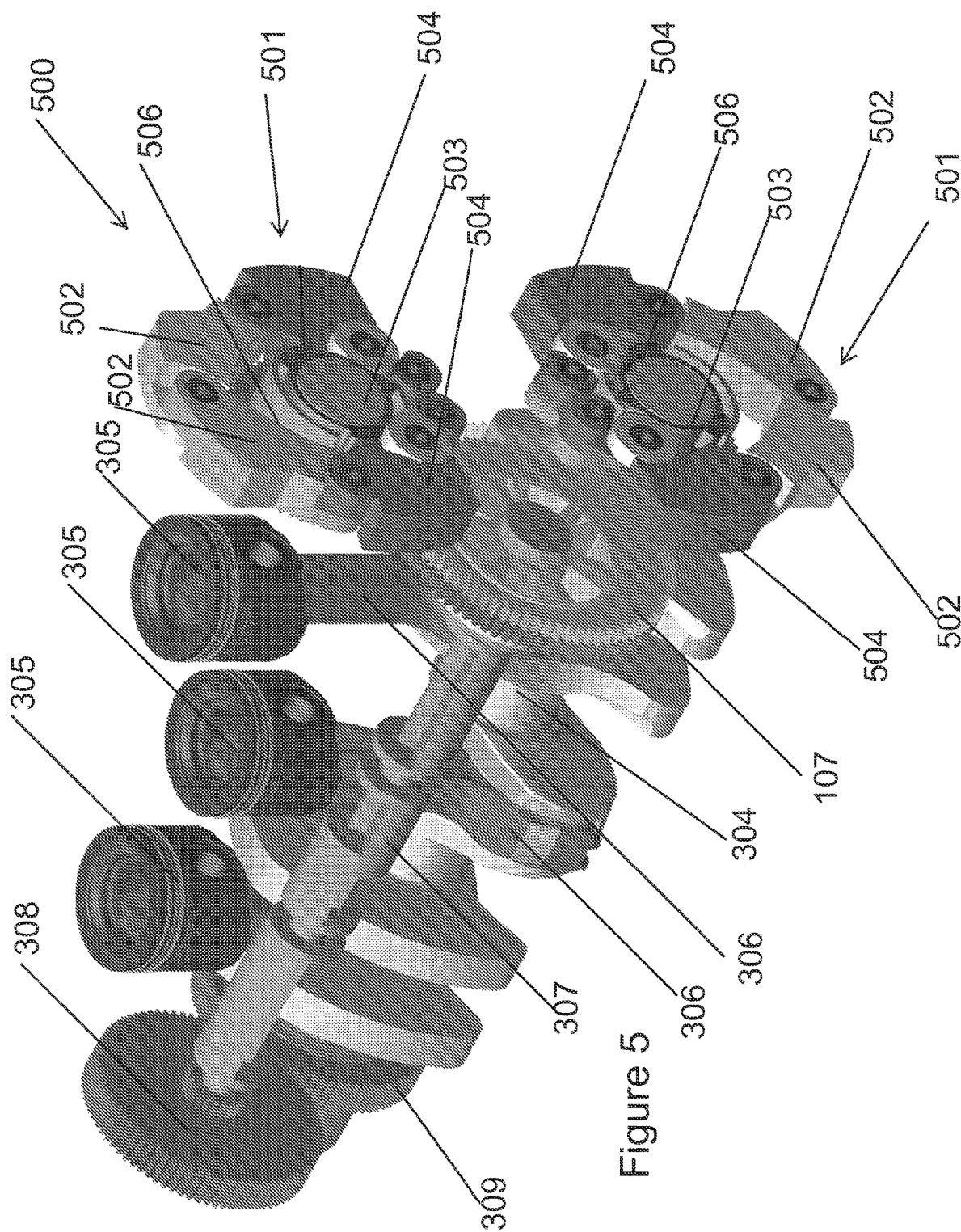
FIG. 5 is a perspective view of an engine system including a variable counterweight system in accordance with another embodiment.

FIG. 5 is a perspective view of an engine system 500 including a variable counterweight system in accordance with another embodiment. The engine system 500 includes a pair of synchronous co-rotating variable geometry counterweight assemblies 501. The variable geometry counterweight assemblies 501 are configured to rotate about variable geometry counterweight shaft 503 upon actuation by the rotatable actuator 107.

The variable geometry counterweight assemblies 501 include a rotating cam 506 configured to geometrically reconfigure the variable geometry counterweight assemblies 501 to move or reposition the center of gravity of the variable geometry counterweight assemblies 501. The system can include a position sensor configured to detect a position of the cam for feedback control of the variable counterweight system in any and all embodiments. The rotating cam 506 is configured to, upon rotation in a first direction, cause the radially outer linkages 502 and the radially inner linkages 504 to pivot to move the center of gravity of the variable geometry counterweight assemblies 501 away from the axis of the variable geometry counterweight shaft 503. The amount of offset of the center of gravity of the variable geometry counterweight systems 501 can be controlled, for example, in response to an amplitude or frequency of a vibration of the engine system 500 or in response to particular conditions of operation of the engine system 500, such as the rotational speed of the engine, the load of the engine, or the activation or deactivation of particular cylinders of the engine system 500. As discussed herein, cylinders of the engine system 500 may be deactivated for fuel efficiency and may be re-activated as power needs change. The change in operation of cylinders of the engine system 500 impacts the vibrations of the engine system 500.

Figure 6:
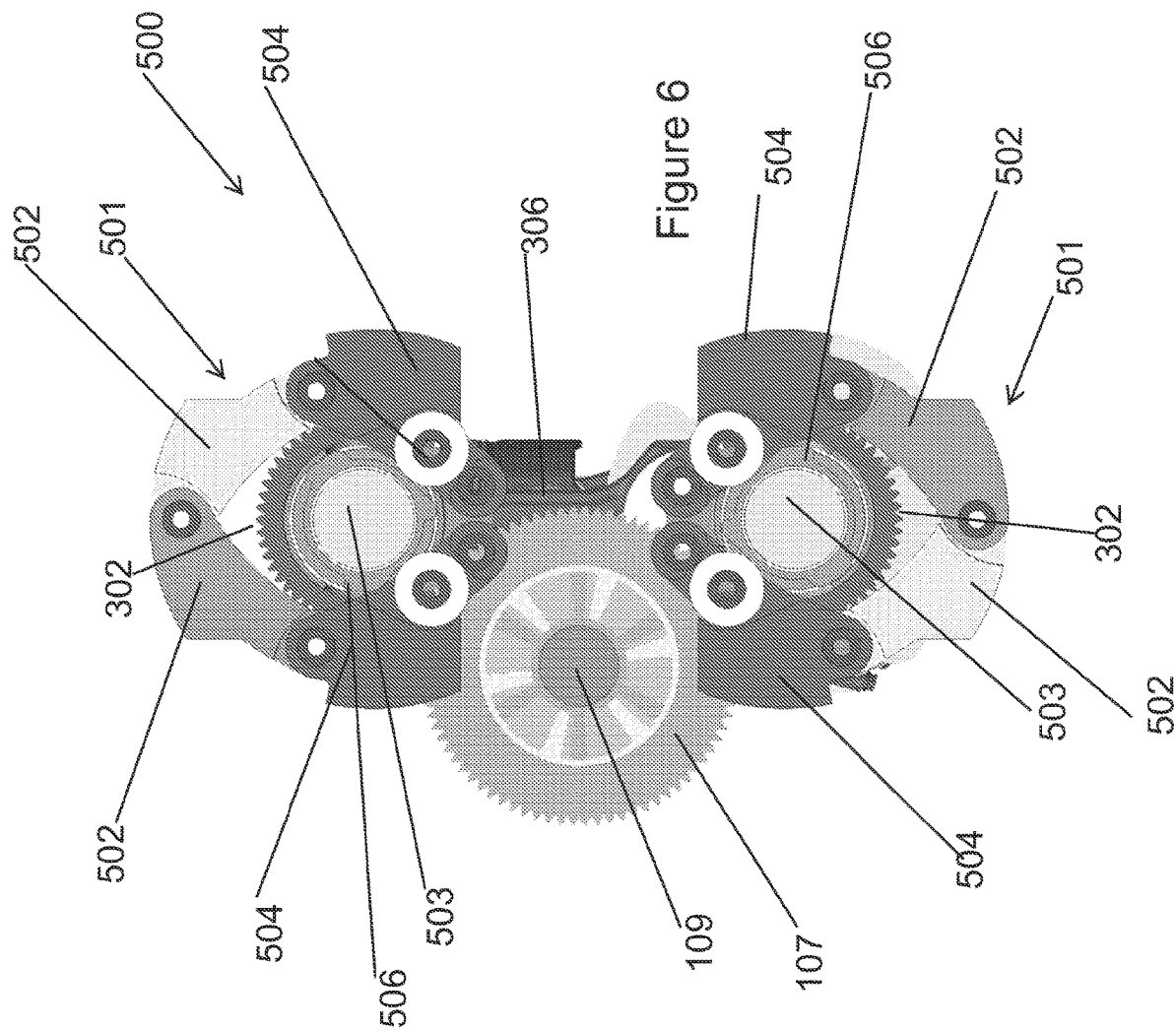
FIG. 6 is an end view of the engine system of FIG. 5.

FIG. 6 is an end view of the engine system of FIG. 5. The variable geometry counterweight assemblies 501 are rotated about the variable geometry counterweight shaft 503 via variable geometry counterweight system gears 302, which are rotated by the rotatable actuator 107 coupled to the crankshaft 204.

Figure 7:
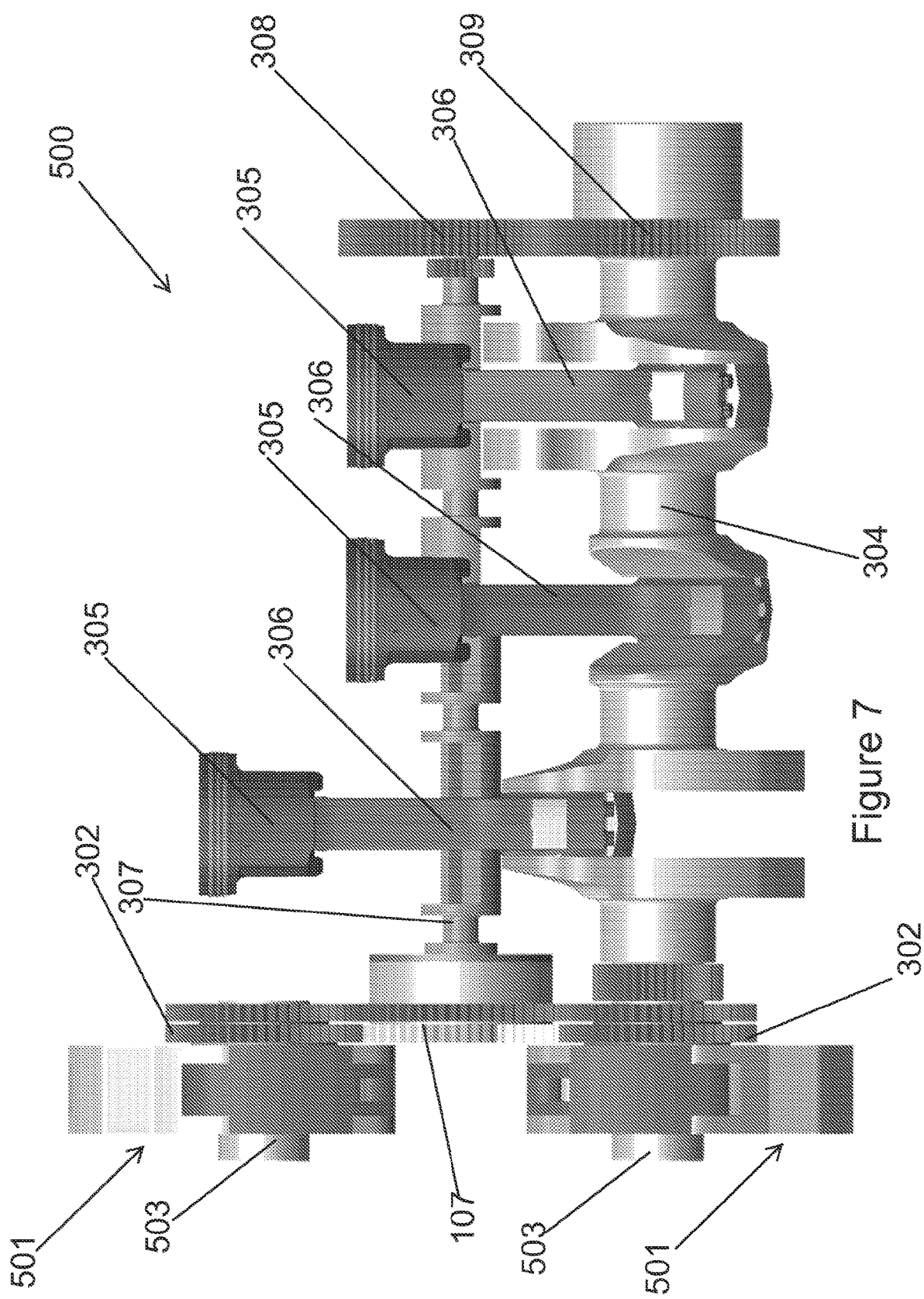
FIG. 7 is a side view of the engine system of FIG. 5.
Figure 8:
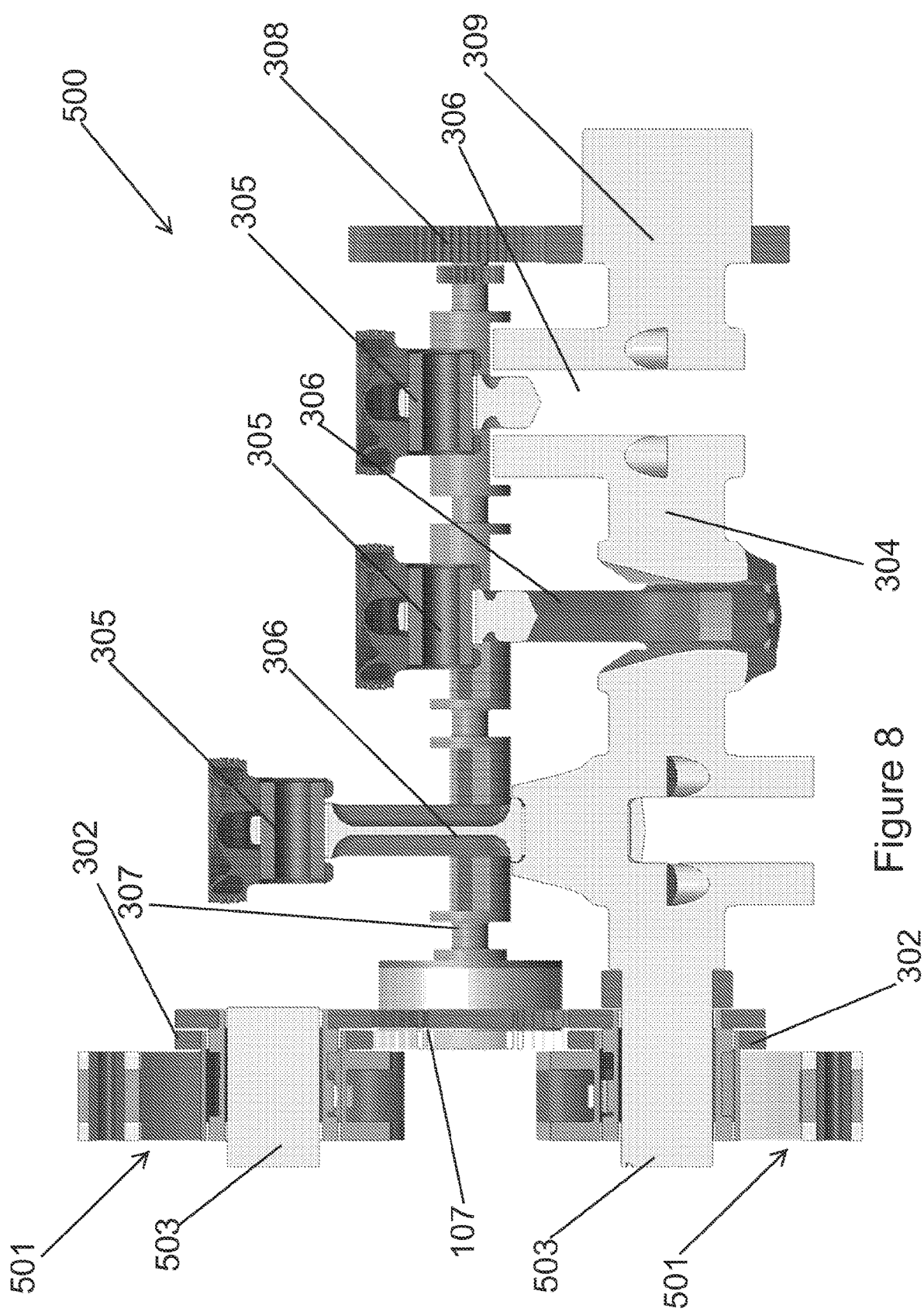
FIG. 8 is side cross sectional view of the engine system of FIG. 5.

FIG. 7 is a side view of the engine system of FIG. 5, and FIG. 8 is side cross sectional view of the engine system of FIG. 5. As demonstrated in FIGS. 7 and 8, one of the variable geometry counterweight shafts 503 can be integrally coupled with the crankshaft 304 of the engine system 500. The actuator shaft 307 can be parallel to the crankshaft 304.

Figure 9:
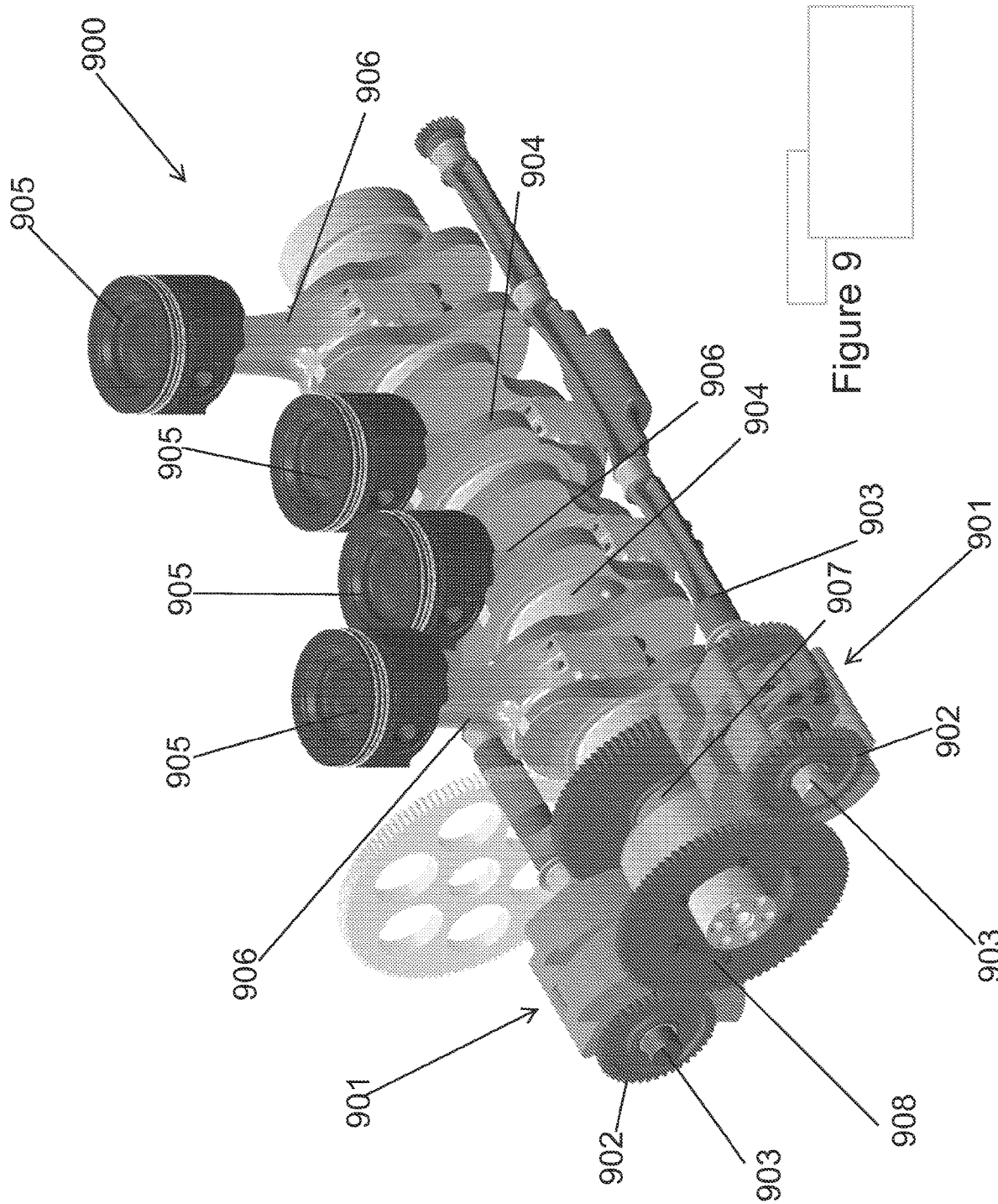
FIG. 9 is a perspective view of a 4 cylinder engine system including a variable counterweight system in accordance with an embodiment.

FIG. 9 is a perspective view of a 4 cylinder engine system including a variable geometry counterweight system in accordance with an embodiment. An engine system 900 includes a 4 cylinder engine including four pistons 905 coupled to piston rods 906 and coupled to a crankshaft 904. In contrast to the engine system 500, the crankshaft 904 is not directly coupled to the shaft 903 of variable geometry counterweight assemblies 901. The crankshaft 904 is directly coupled to actuator shaft 907 of rotatable actuator 908. The rotatable actuator 908 is configured to rotate the variable geometry counterweight assemblies 901 via the variable geometry counterweight system gears 902. The variable geometry counterweight systems 901 are synchronous co-rotating counterweights configured for geometrical reconfiguration to move the position of the center of gravity and thereby vary the moment applied to the engine system 900.

Figure 10:
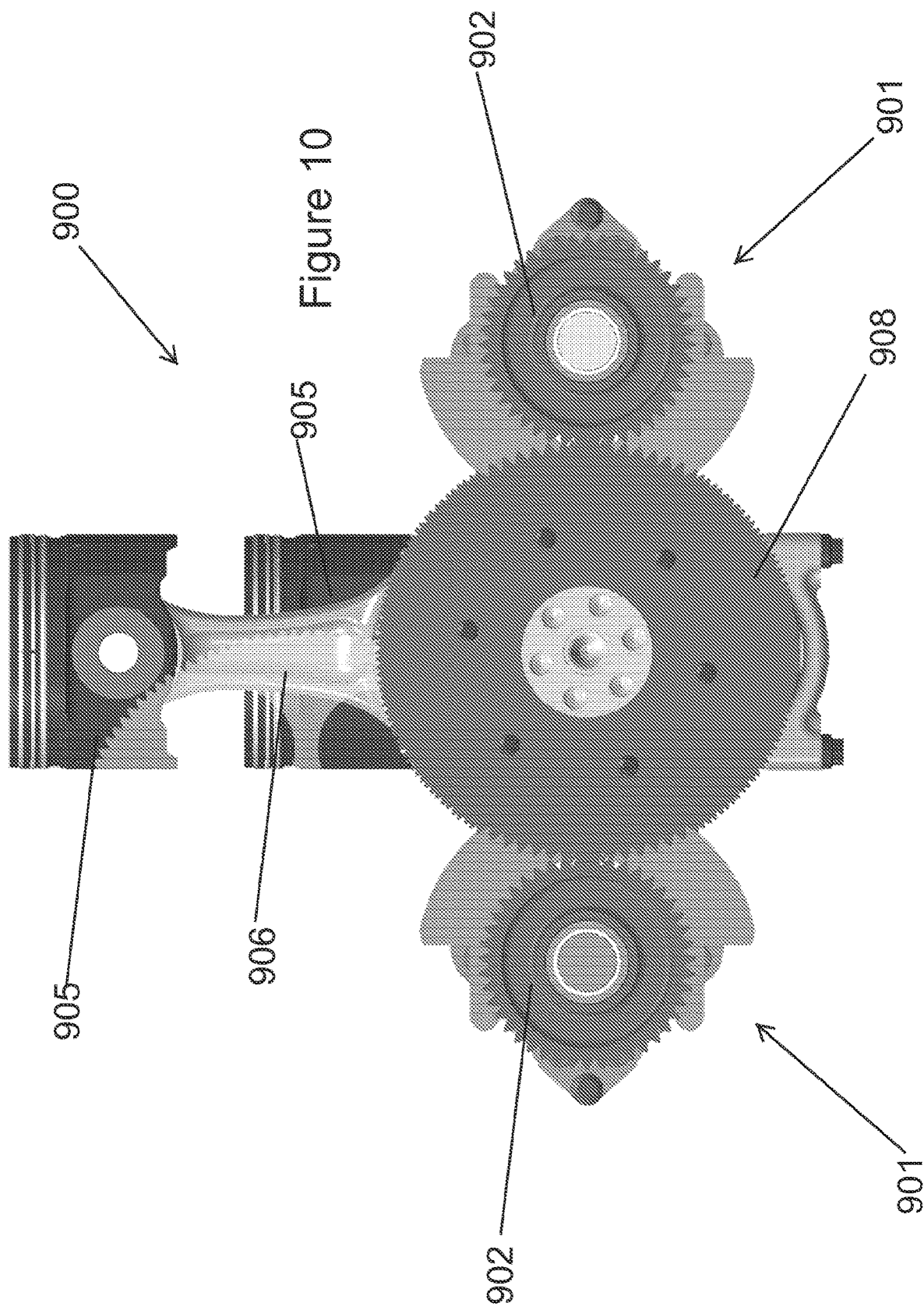
FIGS. 10 and 11 are end views of the engine system of FIG. 9.
Figure 11:
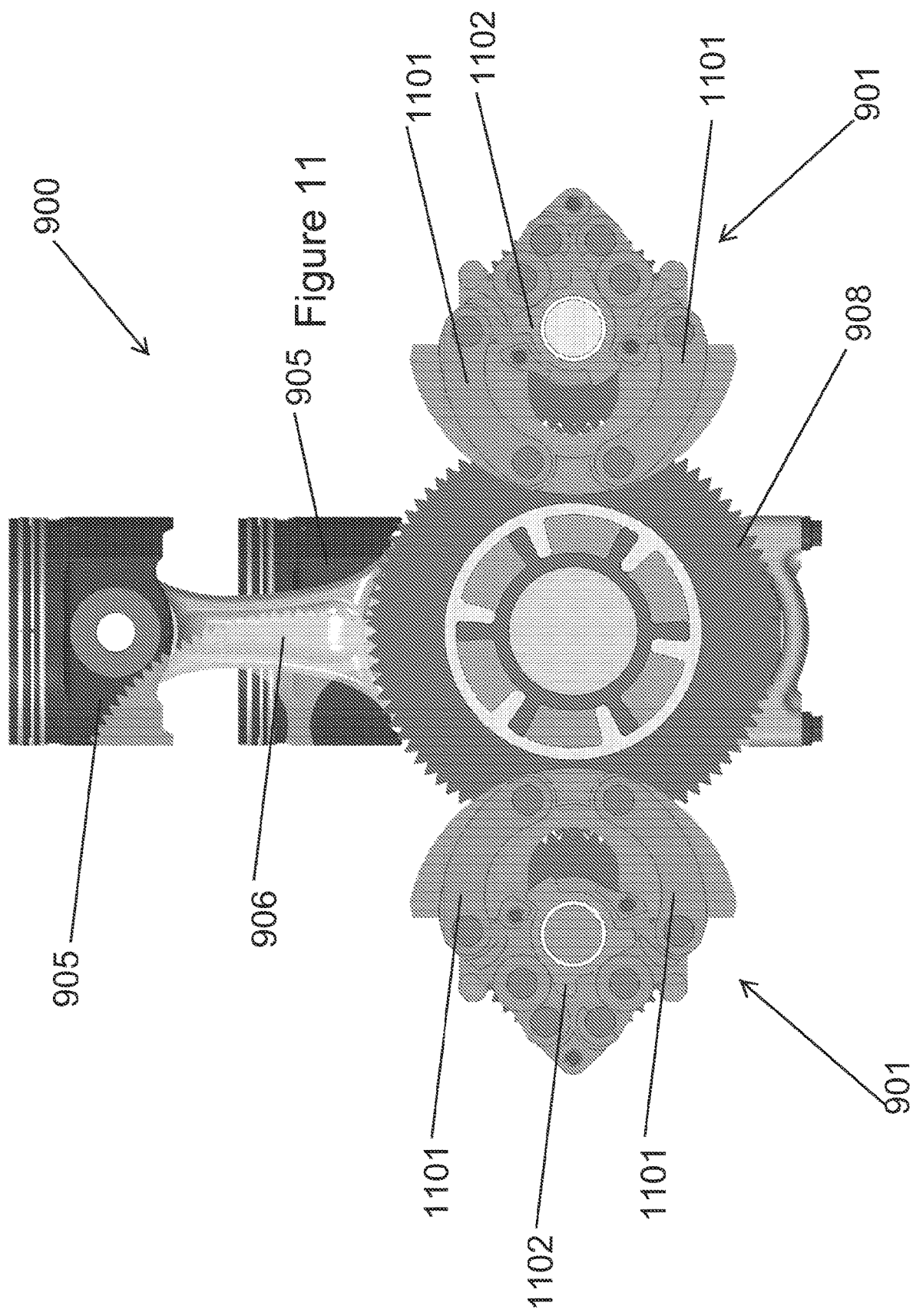

FIGS. 10 and 11 are end views of the engine system of FIG. 9. FIG. 11 is an end view showing a cross-sectional view through the variable geometry counterweight assemblies 901. The variable geometry counterweight assemblies 901 are positioned transverse to the axis of the pistons 905.

It should be noted that this position does not preclude assemblies 901 from being mounted in other orientations with respect to engine assembly 900. The variable geometry counterweight assemblies 901 include a plurality of extending linkages 1101 actuated by a rotating cam 1102 configured to rotate to extend or retract extending linkages 1101 to move or offset the center of gravity of the variable geometry counterweight assembly 901 from the center of the variable geometry counterweight assembly 901 and thereby generate a varying moment on the engine system 900.

Figure 12:
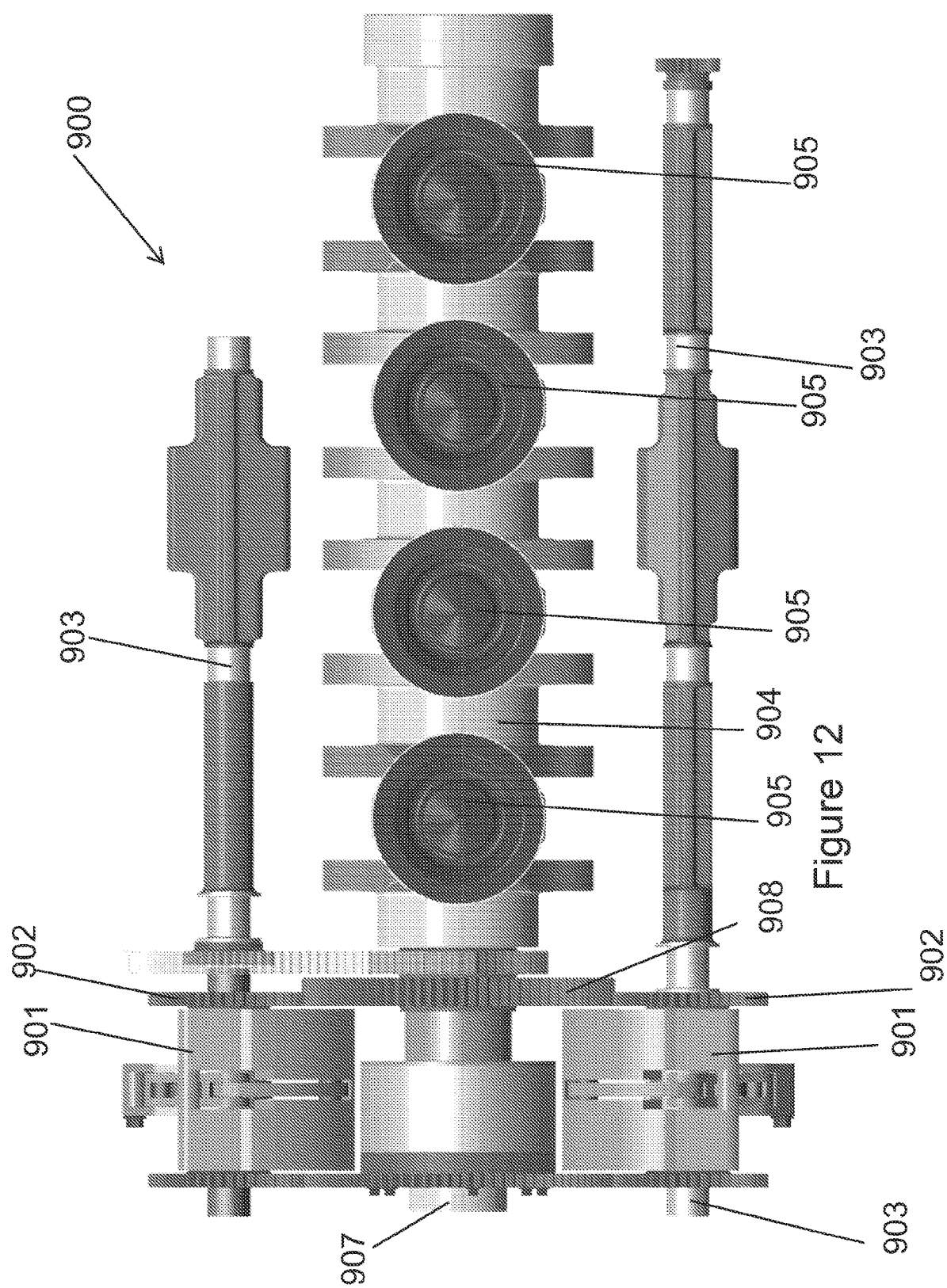
FIG. 12 is a top view of the engine system of FIG. 9.
Figure 13:
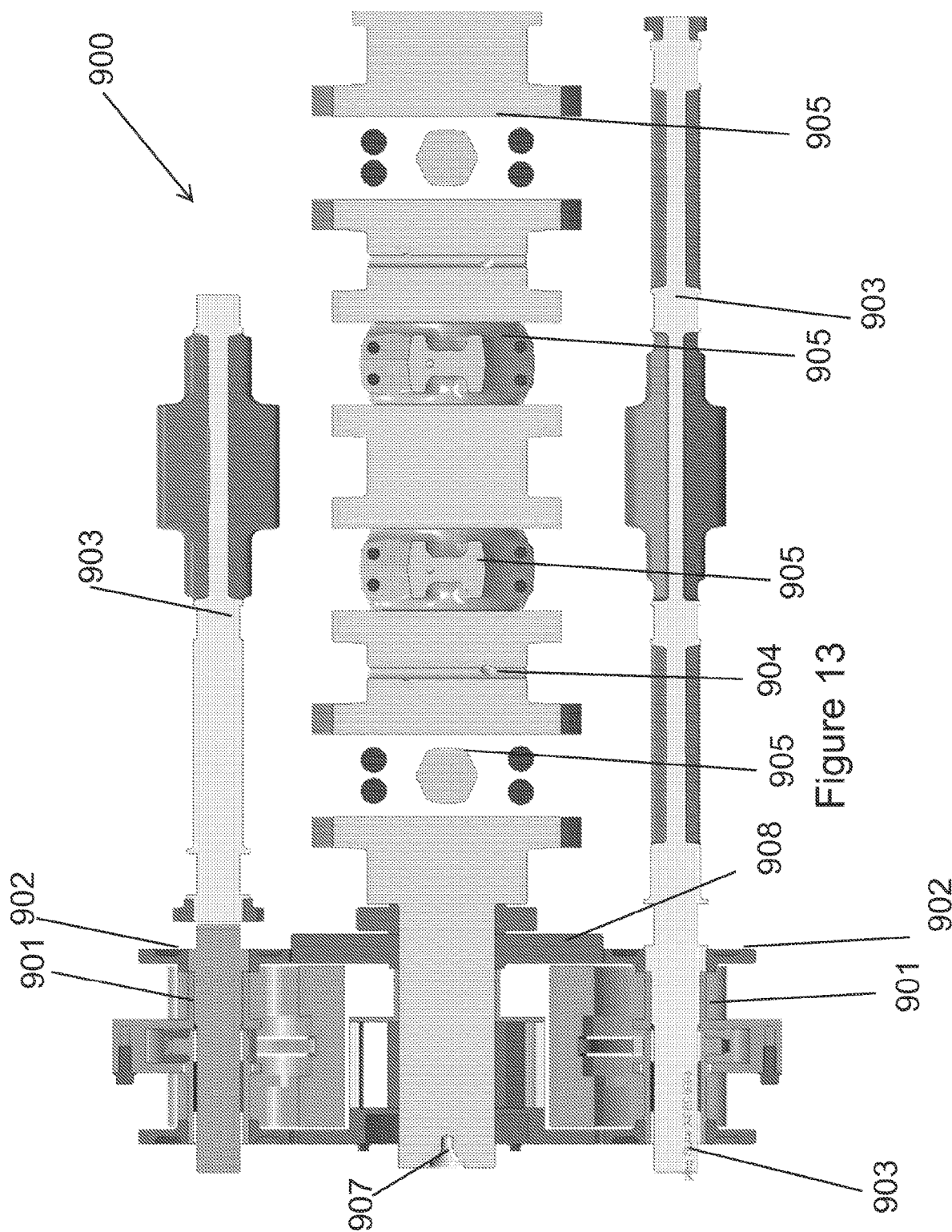
FIG. 13 is a top cross sectional view of the engine system of FIG. 9.

FIG. 12 is a top view of the engine system of FIG. 9, and FIG. 13 is a top cross sectional view of the engine system of FIG. 9. The shafts 903 of the variable geometry counterweight assemblies 901 can include a fluid line, for entry or exhaust of oil or hydraulic fluid configured to actuate a phaser. The change in fluid pressure provides or retracts force for changing the position of the center of gravity of the variable geometry counterweight assemblies 901, for example, in response to changing conditions of the engine system 900.

Figure 14:
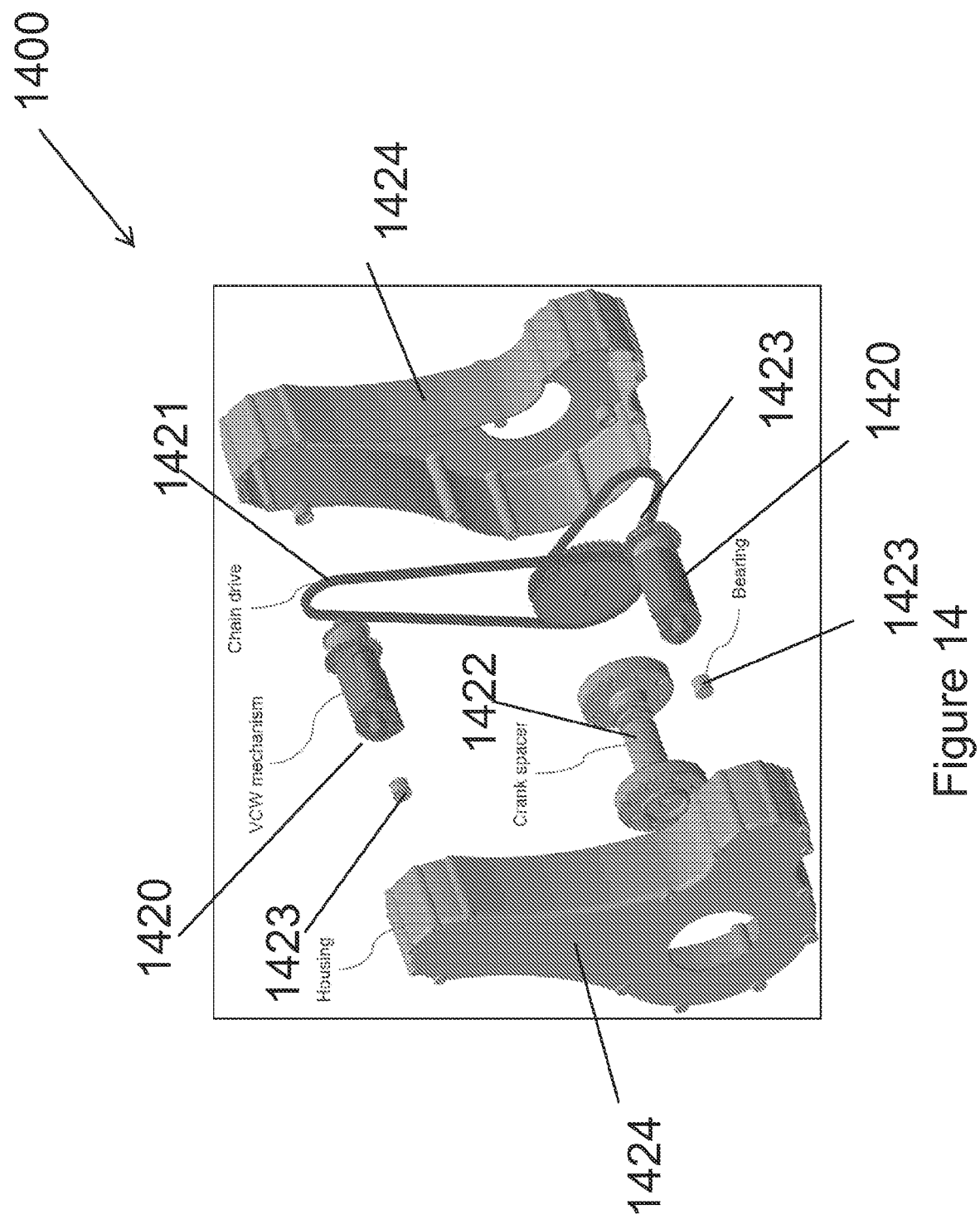
FIG. 14 is an exploded perspective view of a four-bar linkage variable counterweight system in accordance with an embodiment.

FIG. 14 is an exploded perspective view of a four-bar linkage variable counterweight system, in accordance with an embodiment. A four-bar linkage variable counterweight system 1400 includes two variable geometry counterweight mechanisms 1420. The variable geometry counterweight mechanisms 1420 are configured for geometric reconfiguration to change a center of gravity of the mechanism 1420 via a plurality of pivotally connected linkages. The variable geometry counterweight mechanisms 1420 couples to a chain drive assembly 1421 driving the rotation of the variable geometry counterweight mechanisms 1420 from the crankshaft via a crank spacer 1422. The variable geometry counterweight mechanisms 1420 is rotatably housed in a housing 1424 which also houses bearing 1423 permitting the variable geometry counterweight mechanisms 1420 to rotate within the housing 1424.

Figure 15:
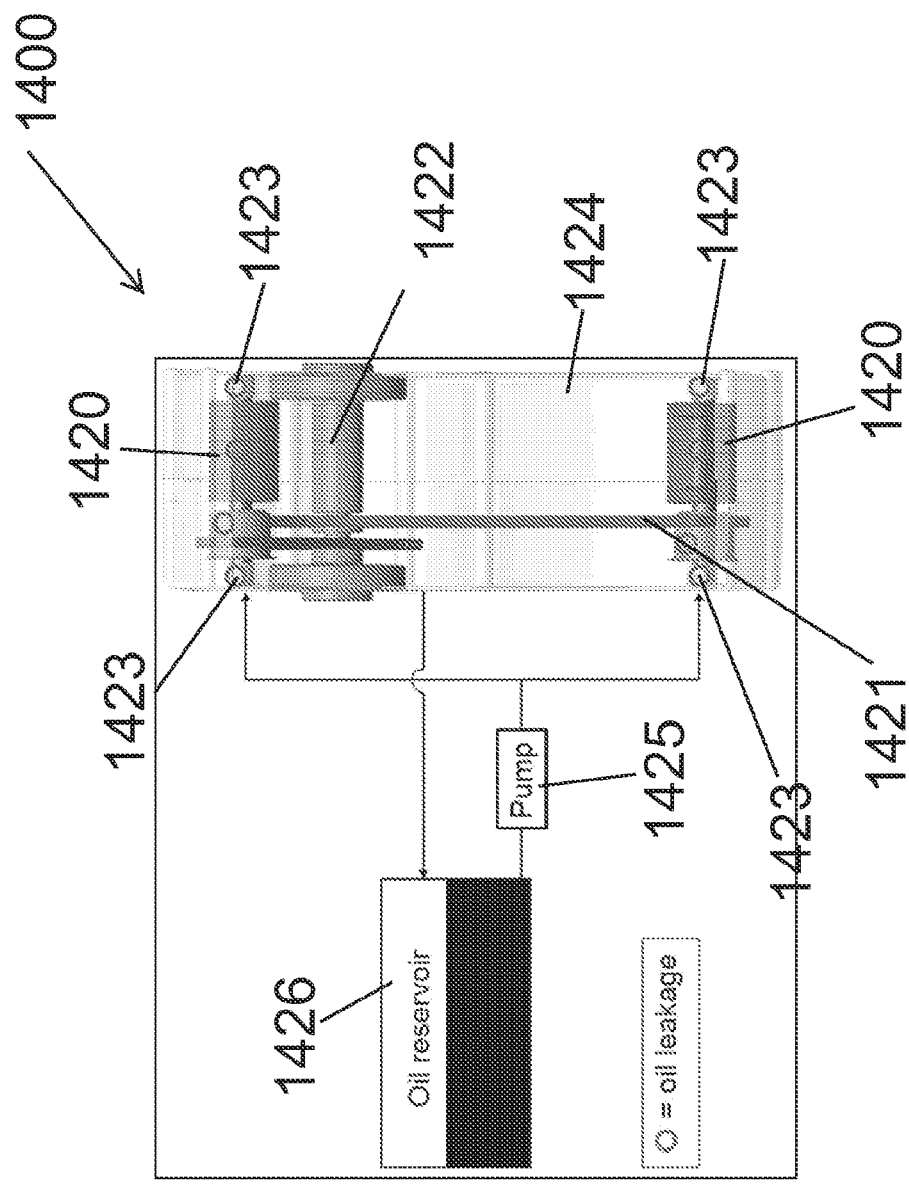
FIG. 15 is a front view of the four-bar linkage variable counterweight system of FIG. 14.

FIG. 15 is a front view of the four-bar linkage variable counterweight system of FIG. 14. The four-bar linkage variable counterweight system 1400 is shown in assembled state in FIG. 15 and is coupled to a pump 1425 for pumping oil from an oil reservoir 1426 for actuation of the variable geometry counterweight mechanisms 1420.

Figures 16A, 16B:
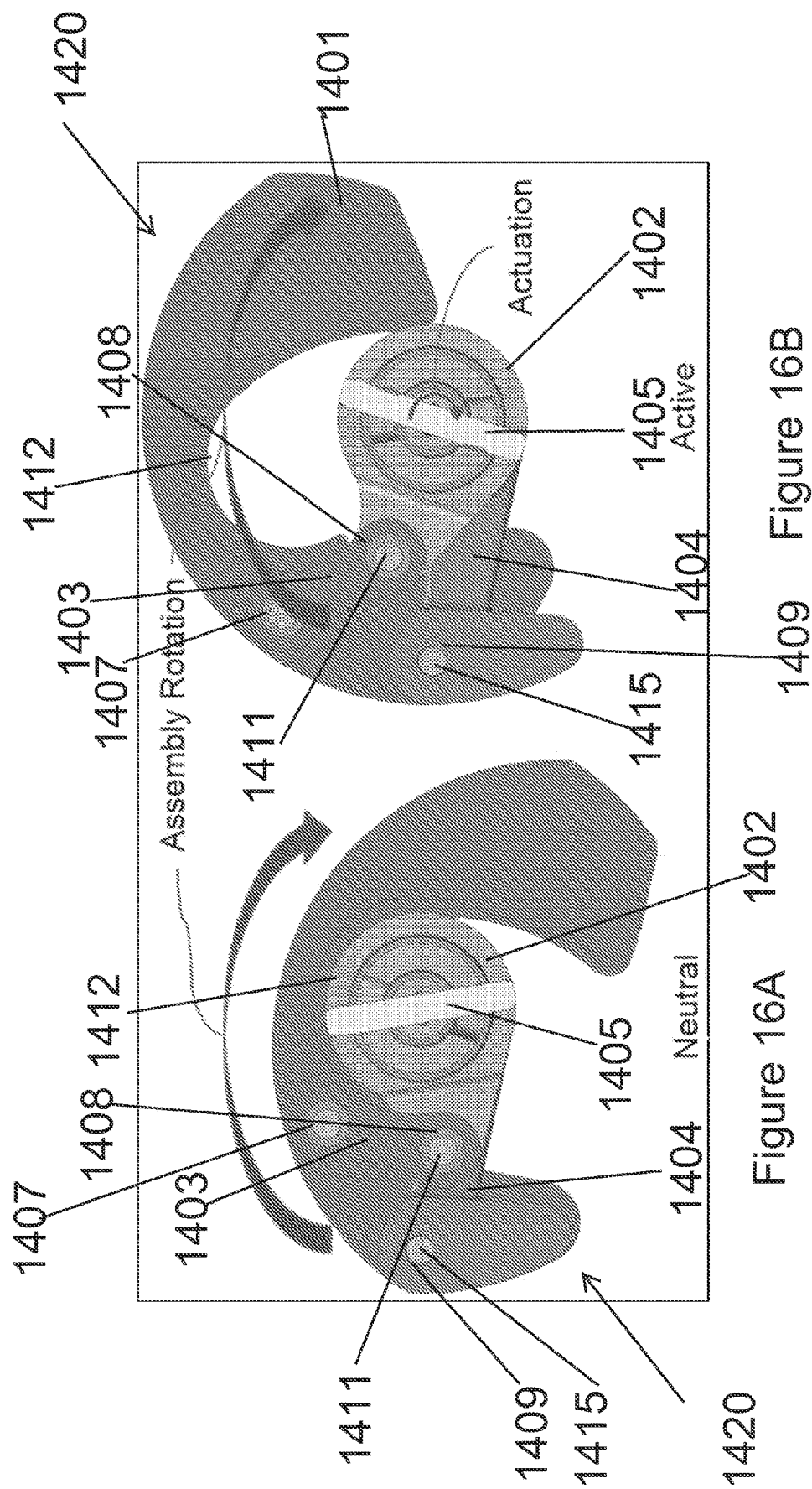
FIGS. 16A and 16B are side views of the four-bar linkage variable counterweight mechanism of the system of FIG. 14.

FIGS. 16A and 16B are side views of the four-bar linkage variable counterweight mechanism of the system of FIG. 14. FIG. 16A shows the variable geometry counterweight mechanisms 1420 in a neutral position, and FIG. 16B shows the variable geometry counterweight mechanisms 1420 in an active position. The variable geometry counterweight mechanisms 1420 include a first linkage 1401 having a pocket 1412. A second linkage 1402 is recessed in the pocket 1412 in the neutral position of the variable geometry counterweight mechanisms 1420. The second linkage 1412 is pivotally coupled to the first linkage by a third linkage 1403 and a fourth linkage 1404. An actuation rod 1405 is coupled to the second linkage 1412 to re-orient the second linkage with respect to the first linkage 1401 via the third linkage 1403 and fourth linkage 1404. The second linkage 1402 is rotatably positioned on bearings 1406 and is rotatably coupled to the third linkage 1403 via a pin 1411 and to the fourth linkage 1404 via bushing 1409. The third linkage 1403 is pivotally coupled to the first linkage via bushings 1407, and pivotally coupled to the second linkage via bearing 1408. The fourth linkage is pivotally coupled to the first linkage via pin 1415 and bushings 1409.

Figure 17:
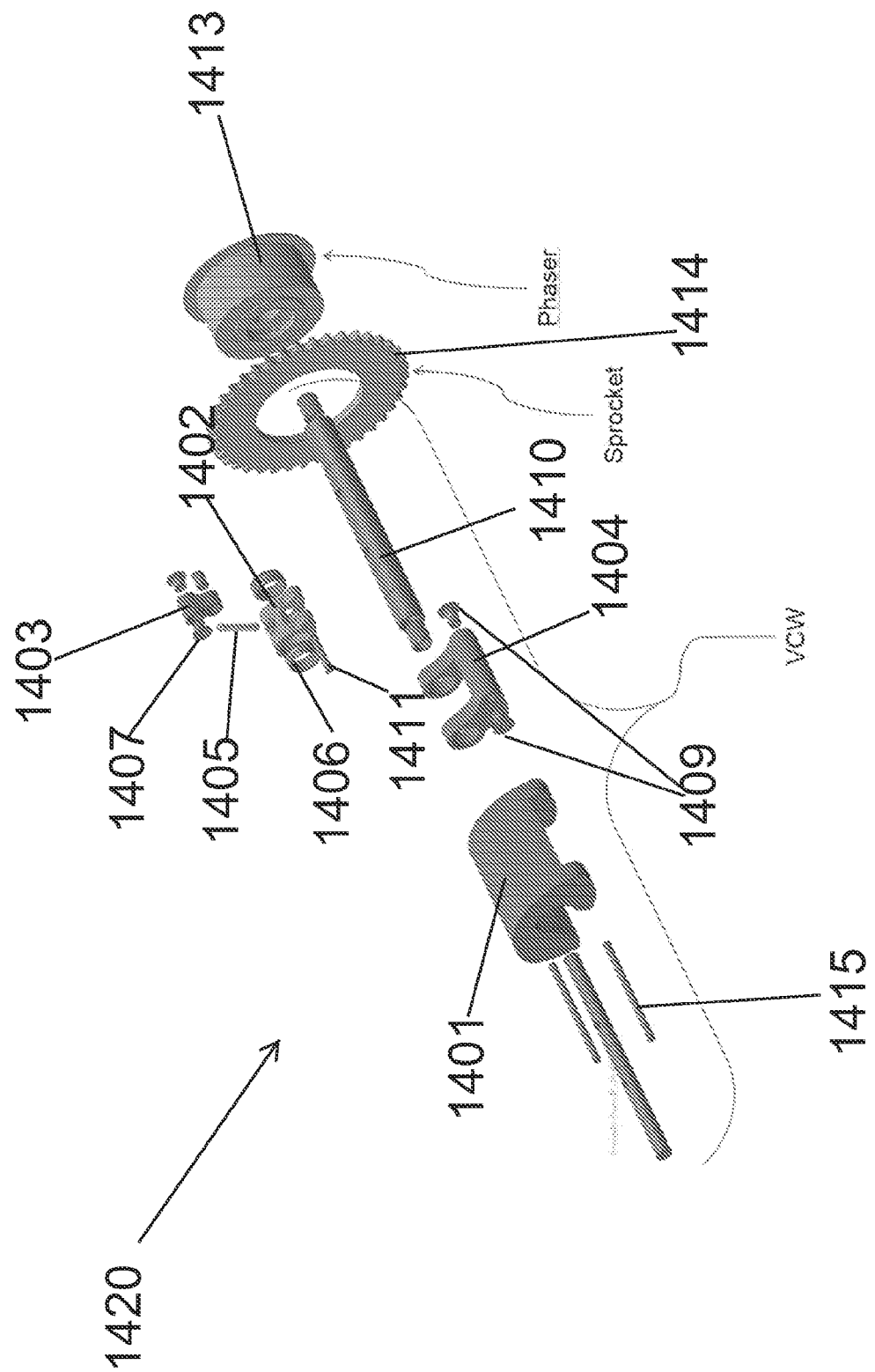
FIG. 17 is an exploded view of the four-bar linkage variable counterweight mechanism of the system of FIG. 14.

FIG. 17 is an exploded view of the four-bar linkage variable counterweight mechanism of the system of FIG. 14. The variable geometry counterweight mechanism 1420 includes a phaser 1413 configured to activate the variable geometry counterweight mechanisms 1420, for example in response to changes in a fluid pressure of a fluid such as oil from oil reservoir 1426 (shown in FIG. 15). The phaser 1413 is configured to be coupled to sprocket 1414 driven by chain drive 1421 (shown in FIG. 14) The variable geometry counterweight mechanisms 1420 includes a variable counterweight shaft 1410

Figure 18:
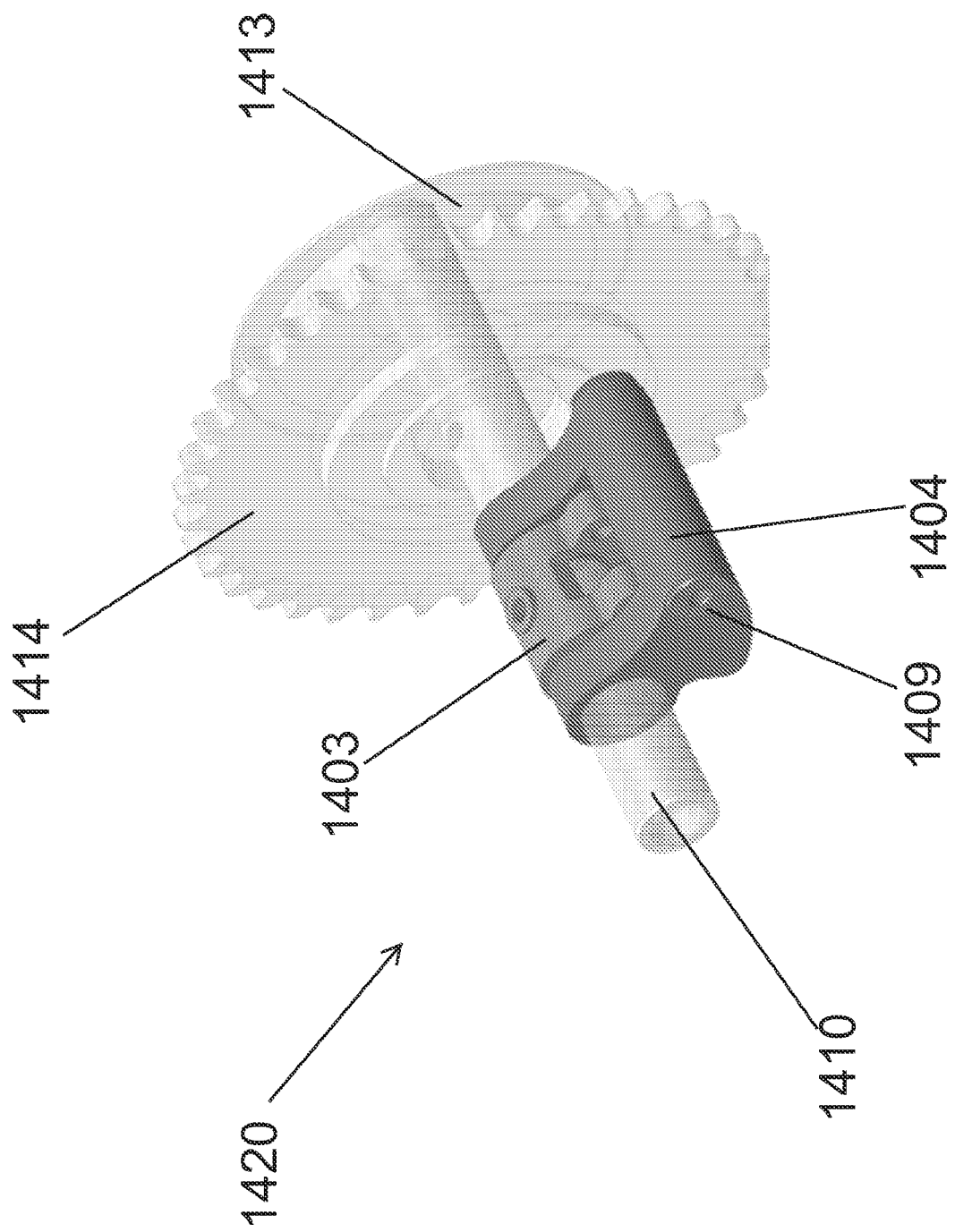
FIG. 18 is a perspective assembled view of the variable geometry counterweight mechanism of FIG. 17.

FIG. 18 is a perspective assembled view of the variable geometry counterweight mechanism of FIG. 17. All four linkages of the variable geometry counterweight mechanisms 1420 are assembled on the variable counterweight shaft 1410 for rotation via sprocket 1414 and phasing to move from the neutral state to the active state and back via the phaser 1413.

In certain embodiments, the engine system 900, 500 or 300 can include a variable geometry counterweight control system configured to control the variable geometry counterweight assemblies and thereby vary the moment generated to counteract the rolling forces generated by the respective engine. The variable geometry counterweight control system may include a controller structured to perform certain operations to cause actuation of the variable geometry counterweight systems based on engine operation parameters. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. In certain embodiments, the controller includes sensor modules configured to determine engine rotational speed, engine load, cylinder activation or deactivation, engine vibrations, (including vibration amplitude and frequency) or other engine operating parameters impacting vibrations in the engine system.

The description herein, including modules, emphasizes the structural independence of the aspects of the controller and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiment disclosed herein may be combined with features of another embodiment disclosed herein as someone of ordinary skill in the art would understand.

The invention claimed is:

1. A variable counterweight system comprising:
   a rotatable actuator;
   a first variable counterweight assembly rotatably coupled to the rotatable actuator to rotate about a first axis, the first variable counterweight assembly configured to geometrically reconfigure between a first geometric configuration and a second geometric configuration;
   wherein within the first geometric configuration of the first variable counterweight assembly the first variable counterweight assembly has a first center of gravity position coincident with the first axis, and within the second geometric configuration of the first variable counterweight assembly the first variable counterweight assembly has a second center of gravity position offset from the first axis;
   a second variable counterweight assembly rotatably coupled to the rotatable actuator to rotate about a second axis, the second variable counterweight assembly configured to geometrically reconfigure between a first geometric configuration and a second geometric configuration;
   wherein within the first geometric configuration of the second variable counterweight assembly the second variable counterweight assembly has a first center of gravity position coincident with the second axis, and within the second geometric configuration of the second variable counterweight assembly the second variable counterweight assembly has a second center of gravity position offset from the second axis.

2. The variable counterweight system of claim 1, wherein the rotatable actuator includes a gear.

3. The variable counterweight system of claim 1, wherein the first variable counterweight assembly includes a first phaser configured to geometrically reconfigure the first variable counterweight assembly, and wherein the second variable counterweight assembly includes a second phaser configured to geometrically reconfigure the second variable counterweight assembly.

4. The variable counterweight system of claim 3, wherein the first phaser includes a plurality of adjustable linkages.

5. The variable counterweight system of claim 4, wherein the plurality of adjustable linkages are pivotally coupled to each other.

6. The variable counterweight system of claim 3, wherein at least one of the first phaser and the second phaser includes a rotatable cam.

7. The variable counterweight system of claim 3, further comprising a position sensor configured to detect a position of at least one of the first phaser and the second phaser.

8. The variable counterweight system of claim 7, further comprising a controller coupled to the position sensor.

9. The variable counterweight system of claim 3, wherein at least one of the first phaser and the second phaser is hydraulically actuated.

10. The variable counterweight system of claim 3, further comprising a condition sensor configured to determine a condition of an internal combustion engine coupled to the variable counterweight system.

11. The variable counterweight system of claim 10, further comprising a controller configured to:
   cause the first phaser to geometrically reconfigure the first variable counterweight assembly in response to an output from the condition sensor; and
   cause the second phaser to geometrically reconfigure the second variable counterweight assembly in response to an output from the condition sensor.

12. The variable counterweight system of claim 11, wherein the condition includes a vibration frequency.

13. The variable counterweight system of claim 11, wherein the condition includes a vibration amplitude.

14. The variable counterweight system of claim 11, wherein the condition includes an engine operation parameter of the internal combustion engine.

15. The variable counterweight system of claim 11, wherein the condition includes a cylinder deactivation or a cylinder activation of at least one cylinder of a plurality of cylinders of the internal combustion engine.

16. The variable counterweight system of claim 11, wherein the condition includes a rotational speed of the internal combustion engine.

17. The variable counterweight system of claim 11, wherein the condition includes a position of the internal combustion engine.

18. A variable counterweight engine system comprising:
   an internal combustion engine comprising an engine block including a plurality of cylinder bores and housing a plurality of pistons, the plurality of pistons including a plurality of piston rods coupled to a crankshaft;
   a rotatable actuator coupled to the engine;
   a first variable counterweight assembly rotatably coupled to the rotatable actuator to rotate about a first axis, the first variable counterweight assembly configured to geometrically reconfigure between a first geometric configuration and a second geometric configuration;
   wherein within the first geometric configuration of the first variable counterweight assembly the first variable counterweight assembly has a first center of gravity position coincident with the first axis, and within the second geometric configuration of the first variable counterweight assembly the first variable counterweight assembly has a second center of gravity position offset from the first axis;
   a second variable counterweight assembly rotatably coupled to the rotatable actuator to rotate about a second axis, the second variable counterweight assembly configured to geometrically reconfigure between a first geometric configuration and a second geometric configuration;
   wherein within the first geometric configuration of the second variable counterweight assembly the second variable counterweight assembly has a first center of gravity position coincident with the second axis, and within the second geometric configuration of the second variable counterweight assembly the second variable counterweight assembly has a second center of gravity position offset from the second axis.

19. The variable counterweight engine system of claim 18, further comprising a first phaser configured to geometrically reconfigure the first variable counterweight assembly, and wherein the second variable counterweight assembly includes a second phaser configured to geometrically reconfigure the second variable counterweight assembly.

20. The variable counterweight engine system of claim 18, wherein at least one of the first variable counterweight assembly and the second variable counterweight assembly are rotatably coupled to the internal combustion engine.

21. The variable counterweight engine system of claim 18, wherein the internal combustion engine is configured for deactivation of at least one cylinder in the plurality of cylinder bores.

22. A method, comprising:
providing a variable counterweight system, the variable counterweight system comprising:
   a rotatable actuator;
   a first variable counterweight assembly rotatably coupled to the rotatable actuator to rotate about a first axis, the first variable counterweight assembly configured to geometrically reconfigure between a first geometric configuration and a second geometric configuration;
   wherein within the first geometric configuration of the first variable counterweight assembly the first variable counterweight assembly has a first center of gravity position coincident with the first axis, and within the second geometric configuration of the first variable counterweight assembly the first variable counterweight assembly has a second center of gravity position offset from the first axis;
   a second variable counterweight assembly rotatably coupled to the rotatable actuator to rotate about a second axis, the second variable counterweight assembly configured to geometrically reconfigure between a first geometric configuration and a second geometric configuration;
   wherein within the first geometric configuration of the second variable counterweight assembly the second variable counterweight assembly has a first center of gravity position coincident with the second axis, and within the second geometric configuration of the second variable counterweight assembly the second variable counterweight assembly has a second center of gravity position offset from the second axis;
geometrically reconfiguring the first variable counterweight assembly from the first geometric configuration to the second geometric configuration; and
geometrically reconfiguring the second variable counterweight assembly from the first geometric configuration to the second geometric configuration.

23. The method of claim 22, wherein geometrically reconfiguring the first variable counterweight assembly from the first geometric configuration to the second geometric configuration and geometrically reconfiguring the second variable counterweight assembly from the first geometric configuration to the second geometric configuration are synchronized.

24. The method of claim 22, further comprising detecting a vibration of an engine coupled to the rotatable actuator.

25. The method of claim 24, further comprising detecting at least one of a frequency and an amplitude of the vibration.

26. The method of claim 22, further comprising detecting at least one of an engine condition and a change in the engine condition of an engine coupled to the rotatable actuator.

27. The method of claim 22, further comprising changing a first phaser to cause geometrical reconfiguration of the first variable counterweight assembly and changing a second phaser to cause geometrical reconfiguration of the second variable counterweight assembly.

* * * * *